(12) United States Patent
Nagaoka et al.

(10) Patent No.: US 8,284,253 B2
(45) Date of Patent: Oct. 9, 2012

(54) VEHICLE PERIPHERY MONITORING APPARATUS

(75) Inventors: Nobuharu Nagaoka, Wako (JP); Makoto Aimura, Wako (JP); Hideki Hashimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/988,551

(22) PCT Filed: Jan. 8, 2009

(86) PCT No.: PCT/JP2009/000044
§ 371 (c)(1),
(2), (4) Date: Oct. 19, 2010

(87) PCT Pub. No.: WO2009/130828
PCT Pub. Date: Oct. 29, 2009

(65) Prior Publication Data
US 2011/0032358 A1 Feb. 10, 2011

(30) Foreign Application Priority Data
Apr. 24, 2008 (JP) .................................. 2008-113858

(51) Int. Cl.
*H04N 7/18* (2006.01)
(52) U.S. Cl. ...................................... 348/148
(58) Field of Classification Search .................. 348/143, 348/148; H04N 7/18
See application file for complete search history.

(56) References Cited

U.S. PATENT DOCUMENTS

| 7,330,568 | B2 | 2/2008 | Nagaoka et al. | |
| 7,512,494 | B2 * | 3/2009 | Nishiuchi | 701/300 |
| 7,586,400 | B2 | 9/2009 | Nagaoka et al. | |
| 7,672,514 | B2 * | 3/2010 | Chang et al. | 382/199 |
| 7,885,430 | B2 * | 2/2011 | Nagaoka et al. | 382/104 |

(Continued)

FOREIGN PATENT DOCUMENTS
JP 2004-303219 A 10/2004
(Continued)

OTHER PUBLICATIONS

Haritaoglu, I. et al., "W4: Real-Time Surveillance of People and Their Activities", IEEE Transactions on Pattern Analysis and Machine Intelligence, IEEE Service Center, Los Alamitos, CA, US, vol. 22, No. 8, Aug. 1, 2000, pp. 809-830, XP000976488, ISSN: 0162-8828, DOI: DOI: 10.1109/34.868683 *sect. 3; p. 816, col. 2; figures 9-19*.

Isard, M. et al., "Condensation-conditional density propagation for visual tracking", International Journal of Computer Vision, Dordrecht, NL, vol. 29, No. 1, Jan. 1, 1998, pp. 5-28, XP002329561, DOI: DOI:10.1023/A: 1008078328650 * sect. 7.1 figures 8-10 *.

(Continued)

*Primary Examiner* — Tung Vo
(74) *Attorney, Agent, or Firm* — Carrier Blackman & Associates, P.C.; Joseph P. Carrier; William D. Blackman (57) ABSTRACT

Provided is an apparatus capable of, even when an object is moving, measuring the position of the object at a high accuracy. According to a vehicle periphery monitoring apparatus (10), an enlargement factor relevant to when the degree of correlation between an enlarged local region (EB($\gamma_i$)) obtained by enlarging a local region (B(k−1)) at a previous time (k−1) and a local region (B(k)) at a time (k) later than the previous time (k−1) becomes the maximum is calculated as a change rate (Rate(k)) of the size of the local region (B(k)). Based on the change rage (Rate(k)), it is possible to measure the distance (Z(k)) from a vehicle (1) to the object or the position (P(k)) at a high accuracy even when the object is moving.

3 Claims, 5 Drawing Sheets

U.S. PATENT DOCUMENTS

| | | | |
|---|---|---|---|
| 7,949,151 B2 * | 5/2011 | Taniguchi et al. | 382/104 |
| 2006/0222206 A1 * | 10/2006 | Garoutte | 382/103 |
| 2007/0171033 A1 | 7/2007 | Nagaoka et al. | |
| 2008/0130954 A1 | 6/2008 | Taniguchi et al. | |

FOREIGN PATENT DOCUMENTS

| | | |
|---|---|---|
| JP | 2007-188417 A | 7/2007 |
| JP | 2007-213561 A | 8/2007 |
| JP | 2007-279808 A | 10/2007 |
| JP | 2007-310705 A | 11/2007 |
| JP | 2007-334511 A | 12/2007 |
| JP | 2008-021034 A | 1/2008 |

OTHER PUBLICATIONS

Micilotta and R Bowden A S: "View-based Location and Tracking of Body Parts for Visual Interaction", Proceedings of the British Machine Vision Conference, XX, XX, vol. 2, Sep. 1, 2004, pp. 849-859, XP002392458, *sect. 3 and 4.2 figure1*.

Cristobal Curio et al., "Walking Pedestrian Recognition", IEEE Transactions on Intelligent Transportation System, IEEE, Piscataway, NJ, USA, vol. 1, No. 3, Sep. 1, 2000, XP011028374, ISSN: 1524-9050 *abstract, sect. IV par. 1, sect. V par. 2 *.

* cited by examiner

VEHICLE PERIPHERY MONITORING APPARATUS

PRIORITY CLAIM

The present application is based on and claims the priority benefit of Japanese Patent Application 2008-113858 filed on Apr. 24, 2008, the contents of which are incorporated herein by reference in its entirety.

BACKGROUND OF THE INVENTION

1. Field of the Invention

The present invention relates to a vehicular periphery monitoring apparatus configured to monitor the periphery of a vehicle according to an image acquired from an imaging device mounted in the vehicle.

2. Description of the Related Art

There has been disclosed an art which determines the position of an object such as a pedestrian or the like in real space on the basis of an image captured by a camera mounted in a vehicle at two different times and judges the level of contact possibility between the vehicle and the object on the basis of the determination result (for example, refer to Japanese Patent Laid-open No. 2007-213561). Since the relative position of the object with respect to the vehicle changes when the vehicle is moving, by using the changed size of the object in the captured image, the position of the object in real space is determined.

However, in case that the object is moving, in addition to the relative position of the object with respective to the vehicle, the change of the shape or posture of the object will also affect the size thereof in the image, the accuracy of distance determination may be deteriorated.

SUMMARY OF THE INVENTION

The present invention has been accomplished in view of the aforementioned problems, and it is therefore an object of the present invention to provide a vehicular periphery monitoring apparatus capable of determining the position of an object at a high accuracy even when the object is moving.

A first aspect of the present invention provides a vehicular periphery monitoring apparatus configured to monitor a periphery of a vehicle according to an image acquired from a single imaging device mounted in the vehicle to denote the periphery of the vehicle. The vehicular periphery monitoring apparatus comprises: a first processing element configured to set a region in the image where an object is present as an object region and to set a partial region of the object region where a partial portion of the object with relatively less motions is present as a local region; and a second processing element configured to calculate a change rate of the size of the local region in the image and determine a distance from the vehicle to the object according to the change rate of the size of the local region.

According to the vehicular periphery monitoring apparatus of the first aspect of the present invention, on the basis of the change rate of the size of the image region where the partial portion of the object with less motions is present, in other words, the local region where the change of the size due to the motions of the object is inhibited to the minimum, the distance from the vehicle to the object or the position of the object can be determined at a high accuracy. Note that the image captured from the imaging device includes not only the captured image itself but also an image obtained after performing an image treatment on the captured image.

A second aspect of the present invention is dependent on the first aspect of the present invention, wherein the first processing element determines the type of the object, and sets the local region on basis of the type of the object.

According to the vehicular periphery monitoring apparatus of the second aspect of the present invention, in consideration of the fact that the partial portion with relatively less motions will become different in relation to different types of the objects, therefore, on the basis of the change rate of the size of the local region where the change of the size due to the motions of the object is inhibited to the minimum, the distance from the vehicle to the object or the position of the object can be determined at a high accuracy for various types of objects.

A third aspect of the present invention is dependent on the second aspect of the present invention, wherein the first processing element determines whether or not the type of the object is of a pedestrian, and sets an upper portion of the object region as the local region on condition that the type of the object has been determined to be of a pedestrian.

According to the vehicular periphery monitoring apparatus of the third aspect of the present invention, in consideration of the fact that the upper body of a pedestrian serving as the object has less motions than the lower body thereof, therefore, on the basis of the change rate of the size of the local region where the change of the size of due to the motions of the pedestrian is inhibited to the minimum, the distance from the vehicle to the pedestrian serving as the object or the position thereof can be determined at a high accuracy.

A fourth aspect of the present invention is dependent on the first aspect of the present invention, wherein the first processing element evaluates the degree of correlation between an enlarged local region obtained by enlarging a local region at a previous time and a local region at a posterior time later than the previous time; and the second processing element calculates the scale of enlargement of the local region at the previous time when the degree of correlation is the maximum as the change rate of the size of the local region.

According to the vehicular periphery monitoring apparatus of the fourth aspect of the present invention, the scale of enlargement when the degree of correlation between an enlarged local region obtained by enlarging a local region at a previous time (hereinafter, referred to as a previous local region where appropriate) and a local region at a posterior time later than the previous time (hereinafter, referred to as a posterior local region where appropriate) is the maximum is calculated as the change rate of the size of the object region. The enlarged local region with the maximum degree of correlation relative to a later local region is equivalent to a predicted or estimated future image of the previous local region at a later time. Thereby, as aforementioned, on the basis of the change rage of the size of the local region where the partial portion of the object with relatively less motions is present, the distance from the vehicle to the object or the position thereof can be determined at a high accuracy even when the object is moving.

DETAILED DESCRIPTION OF THE PREFERRED EMBODIMENTS

Hereinafter, a vehicle periphery monitoring apparatus of an embodiment according to the present invention will be described in detail with reference to the drawings.

Figure 1:
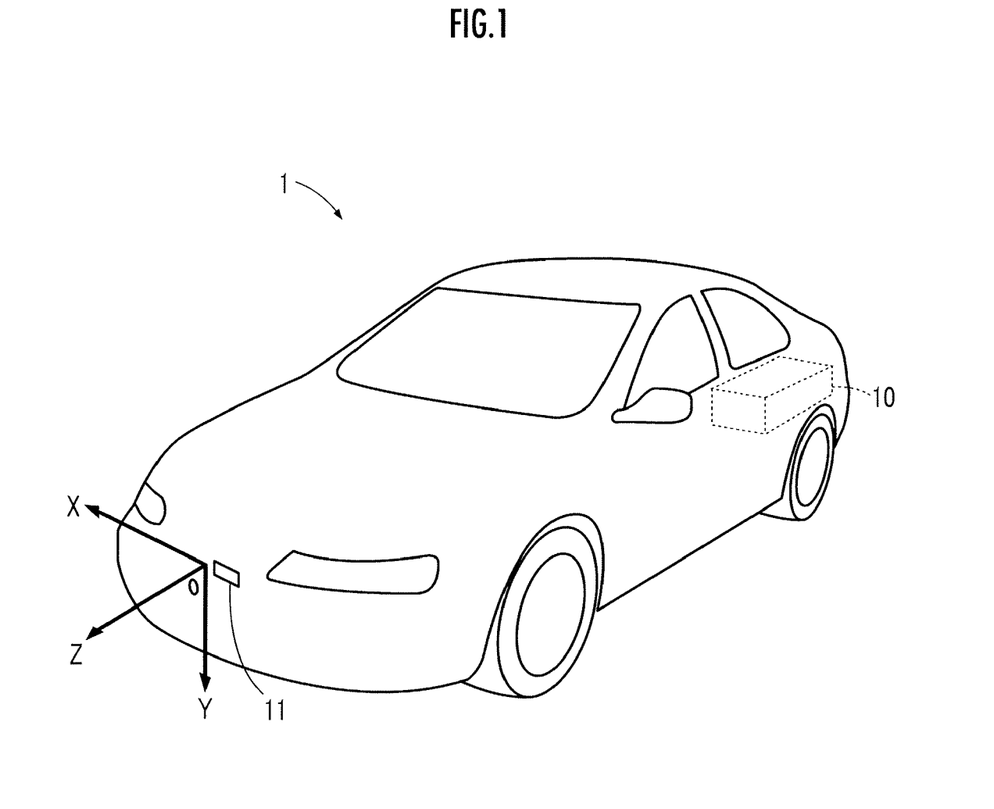
FIG. 1 is a view of a vehicle according to the present invention.

A vehicle (four-wheeled vehicle) 1 illustrated in FIG. 1 is mounted with the vehicle periphery monitoring apparatus 10 and a single infrared camera (imaging device) 11. It is acceptable to use a camera with the sensitivity thereof being adjusted to the other region of wavelength such as visible lights in place of the infrared camera 11 as the imaging device. As illustrated in FIG. 1, a real spatial coordinate system is defined with the origin O at a front portion of the vehicle 1, the X axis extending in the lateral direction, the Y axis extending in the vertical direction and the Z axis extending in the anteroposterior direction of the vehicle 1. The infrared camera 11 is fixed at a front portion of the vehicle 1 for photographing the front side of the vehicle 1.

Figure 2:
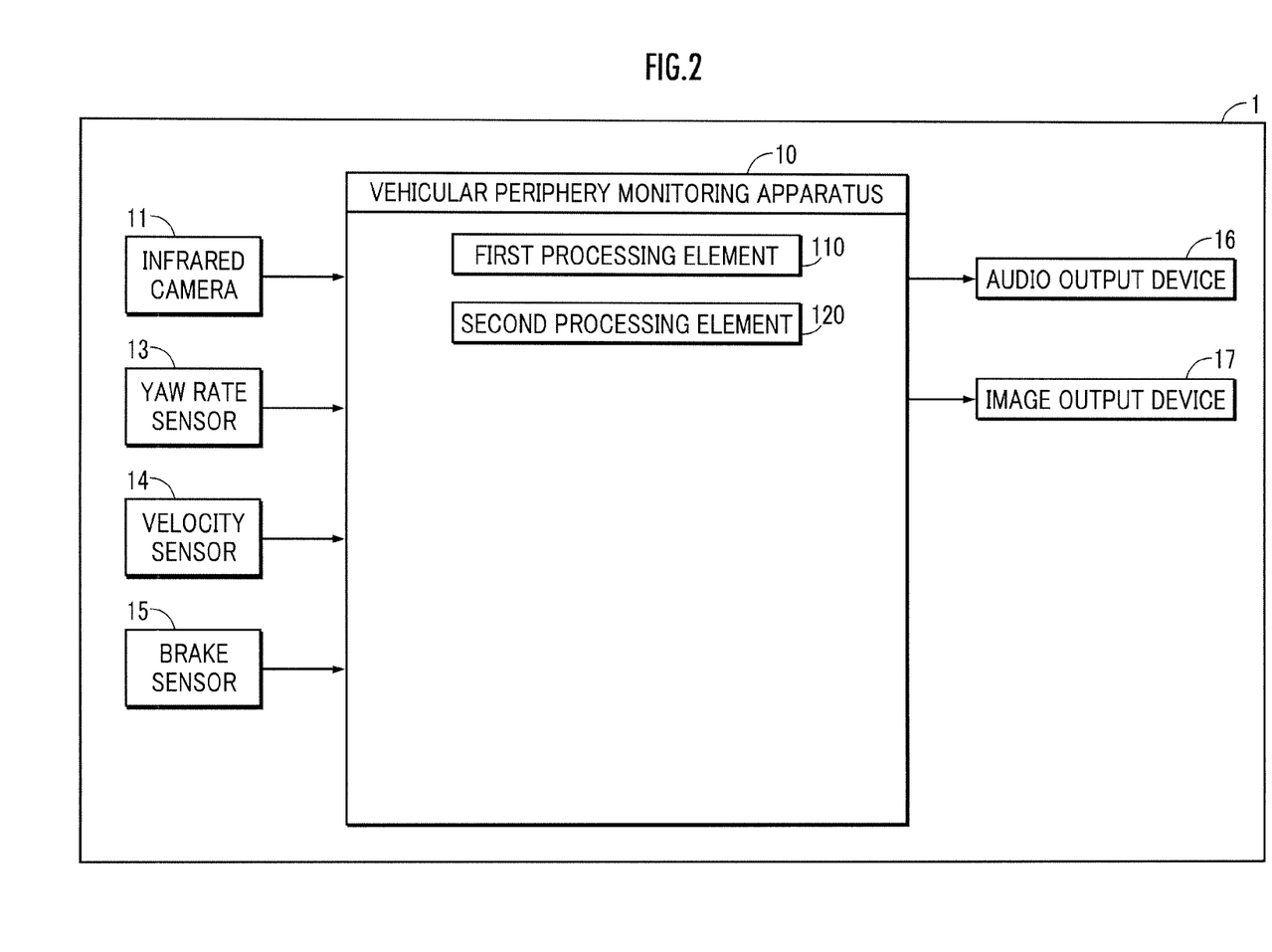
FIG. 2 is a block view of a vehicle periphery monitoring apparatus according to the present invention.

As illustrated in FIG. 2, the vehicle 1 is further mounted with various sensors including a yaw rate sensor 13 for outputting signals according to a yaw rate of the vehicle 1, a velocity sensor 14 for outputting signals according to a velocity thereof, a brake sensor 15 for outputting signals according to the braking state thereof and with a audio output device 16 and an image output device 17. In addition to a HUD (head-up display) displaying an image on the windshield of the vehicle 1, a travel-display device for displaying the travel conditions of the vehicle 1, a display device included in a navigation apparatus or the like may be used as the image output device 17.

The vehicle periphery monitoring apparatus 10 is configured to monitor the periphery of the vehicle 1 according to an image acquired from the infrared camera 11. The vehicle periphery monitoring apparatus 10 is comprised of a computer (composed of a CPU, a ROM, a RAM and electronic circuit such as an I/O circuit, an A/D conversion circuit and the like). The analog signals output from the infrared camera 11, the yaw rate sensor 13, the vehicular velocity 14, the brake sensor 15 and the like are converted by the A/D conversion circuit into digital data and the digital data are input to the vehicle periphery monitoring apparatus 10. According to the input digital data and a vehicle periphery monitoring program stored in memory, the computer performs a series of processes such as recognizing the presence of an object such as a human being or another vehicle, determining the contact possibility between the vehicle 1 and the recognized object, and on the basis of the determination result, outputting audio voices from the audio output device 16 or outputting an image from the image output device 17. Note that the program may be distributed or broadcasted from a server via a network or satellite broadcasting to the vehicular computer at an arbitrary timing or may be preliminarily installed in a memory device such as the RAM of the vehicular computer. The vehicle periphery monitoring apparatus 10 may be composed of a single ECU or by a distribution control system constructed by a plurality of ECU.

The vehicle periphery monitoring apparatus 10 illustrated in FIG. 2 is provided with a first processing element 110 and a second processing element 120. The first processing element 110 is configured to set a region where an object is present in an image which is acquired by the infrared camera 11 denoting the periphery of the vehicle 1 as an object region. The first processing element 110 sets a partial region of the object region where a partial portion of the object with relatively less motions is present as a local region. The second processing element 120 calculates a change rate of the size of the local region and determines a distance from the vehicle 1 to the object according to the change rate of the size of the local region.

Functions of the vehicle 1 and the vehicle periphery monitoring apparatus 10 with the configurations above will be described hereinafter.

First, the first processing element 110 sets the object region according to an image acquired by the infrared camera 11. Specifically, an infrared image obtained from the output signals from the infrared camera 11 is subjected to A/D conversion to generate a gray scale image (FIG. 3/S002).

Figure 3:
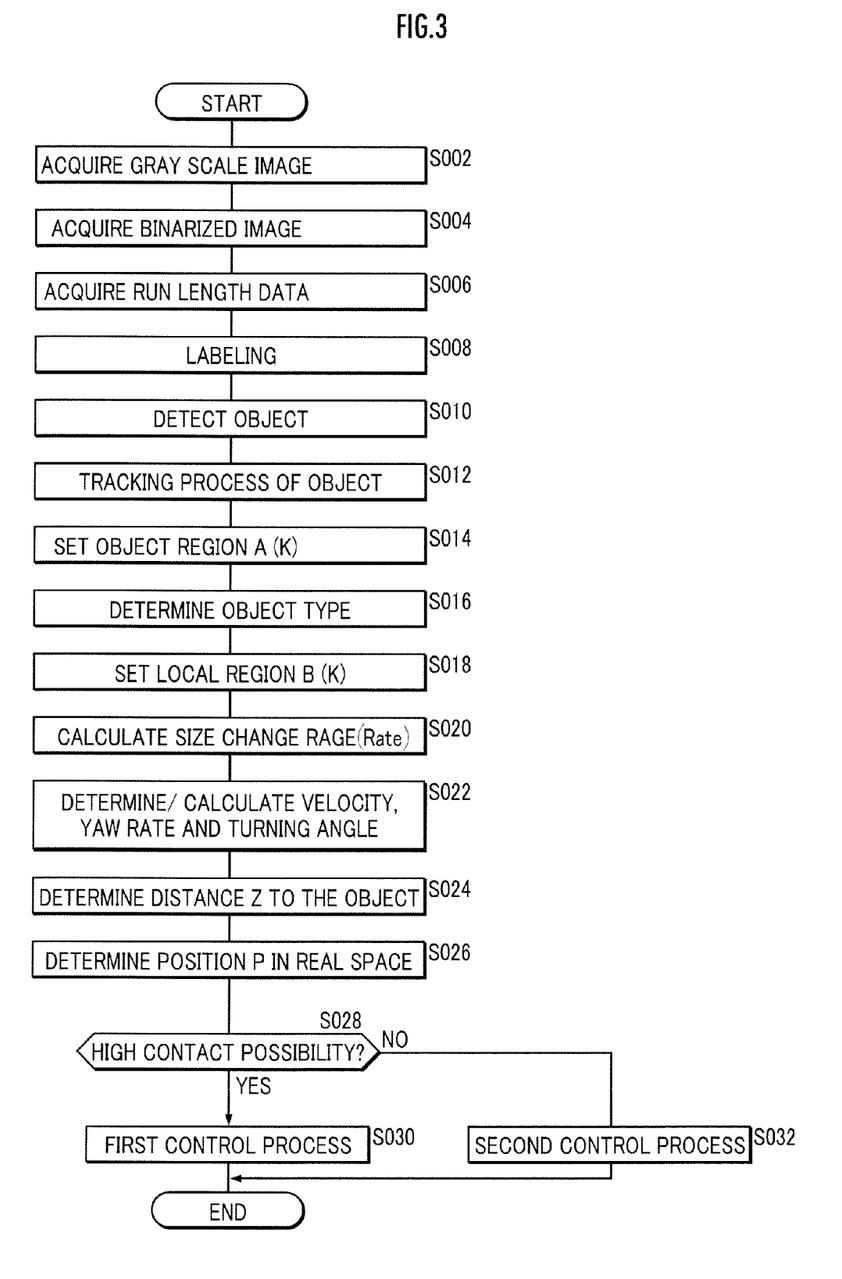
FIG. 3 is a flow chart illustrating functions of the vehicle periphery monitoring apparatus according to the present invention.

Thereafter, the gray scale image is subjected to a binarization process to generate a binarized image (FIG. 3/S004). The binarization process classifies each pixel in the gray scale image into "1" (white) or "0" (black) according to whether or not the luminance thereof is equal to or greater than a threshold. The gray scale image and the binarized image are stored in different image memories.

Subsequently, the group of pixels classified into "1" with high luminance region in the binarized image are classified into lines extending in the lateral direction (x direction) with a width of one pixel in the vertical direction (y direction) of the image, and each line is converted to a run length datum having a coordinate denoting a position of the line (2-dimensional position in the image) and a length thereof (number of pixels) (FIG. 3/S006).

Among the lines denoted by the run length datum, the lines in a group overlapped in the vertical direction of the image are tagged with a label (identifier) (FIG. 3/S008), and the line group is detected as the object (FIG. 3/S010).

Accordingly, as illustrated in FIG. 4(a), an object (binarized object) denoted by slashed lines in the binarized image is detected. In addition to a creature such as a human being (pedestrian) or the like, an artificial article such as another vehicle or the like can be recognized as an object. Moreover, plural local portions of an identical subject may also be recognized as an object.

Thereafter, the first processing element 110 performs a tracking process of the object, namely a process of determining whether or not the detected object is identical every arithmetic computation cycle (FIG. 3/S012). For example, by the usage of the approach disclosed in Japanese Patent Laid-open No. 2001-6096, the shape or size of objects detected from the binarized images at time k−1 and time k respectively is performed according to the distribution correlation of luminance in the gray scale image. When the objects are determined to be identical, the label of the object at time k is modified with the same label as the label of the object at time k−1.

Then, the first processing element 110, on the basis of the position of the gravity center of the object and the disposition behavior of a circumscribed quadrangle of the object in the binarized image, defines a region denoting the object as the object region in the gray scale image (FIG. 3/S014).

Specifically, first, a plurality of masks are defined to be disposed in the gray scale image denoting the periphery of the vehicle 1 at the present time k with the object as a reference. For example, as illustrated in FIG. 4(a), a plurality of defined rectangular masks $a_{i+}$ (i=1, 2, . . . ) and $a_{j-}$ (j=1, 2, . . . ) are lined up in the vertical direction of the object denoted by slashed lines. The plurality of masks are disposed to be centered at the reference line (chain line) which passes through the gravity center or the center of the object and extends in the vertical direction of the image. Then, masks with the correlation equal to or greater than a threshold between the plural masks $a_{i+}$ and $a_{j-}$ in the gray scale image denoting the periphery of the vehicle 1 at a previous time k−1 are searched.

Figure 4:
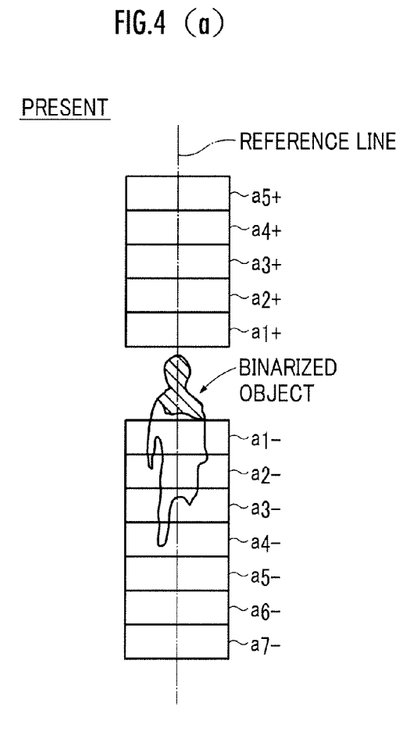
FIG. 4 is an explanatory view related to the setting of an object region.

Thereby, as illustrated in FIG. 4(*b*), the plural masks $a_{i+}$ and $a_{j-}$ with the correlation equal to or greater than a threshold in the present image are searched at the previous image.

Consequently, a region containing the object and a continuous mask with the positional relationship of the object (or the reference line) at the present time k identical to or substantially identical to that at the previous time k−1 among the plural masks is defined as the object region at each time. For example, as illustrated in FIG. 4(*b*), the double-framed rectangular region containing the object and masks of $a_{1-}$ to $a_{4-}$ disposed continuously below the object is defined as the object region A(k−1) at the previous time k−1.

The first processing element 110 determines the type of the object (FIG. 3/S016). Specifically, through matching the shape of the object present in the object region A(k) with the shape patterns of objects stored in a storing device, the type of the object is determined. Thus, for example, whether the type of an object is classified to be of either a pedestrian or the other division can be determined.

It is also acceptable to determine the type of an object according to the shape of the object contained in a partial region (which is different from a local region B(k) to be described later) of the object region A(k). Thus, for example, on condition that a pair of objects (high luminance region) of a linear shape extending vertically are determined to be present in the lower region of the object region A(k), the type of the object is determined to be a pedestrian (to be more accurately, two legs of the pedestrian).

Thereafter, the first processing element 110 sets the local region B(k) according to the type of the object (FIG. 3/S018). Specifically, a partial region of the object region A(k) where a partial portion of the object with relatively less motions is present is set as the local region B(k). Thus, for example, when the type of the object is of a pedestrian, the upper region of the object region A(k) where the upper body of the pedestrian with relatively less motions is present is set as the local region B(k), as illustrated in the upper section and the lower section of FIG. 5. In detail, the local region B(k) is set to a substantially quadratic shape with the upper end thereof overlapped with the upper end of the object region A(k) and with the height H thereof roughly equal to the width W of the object region A(k). In additional to a pedestrian, objects such as large animals, for example a deer and the like, may be classified into various types in which a partial portion with a relatively bigger change amount on the shapes or postures of the objects and the other partial portion with a relatively smaller change amount are concurrently existed according to the motions of the objects, and a partial region intrinsic to each type may be set the local region B(k). Moreover, the determination of the type of objects may be omitted. In this case, the local region B(k) may be set according to an alignment method retrieved from a storing device for aligning the local region B(k) with respect to the object region A(k).

Thereafter, the second processing element 120 calculates the change rate (Rate(k)) of the size of the local region B(k) (expressed by the vertical width and the lateral width of the object region, or the area thereof) (FIG. 3/S020).

Figure 5:
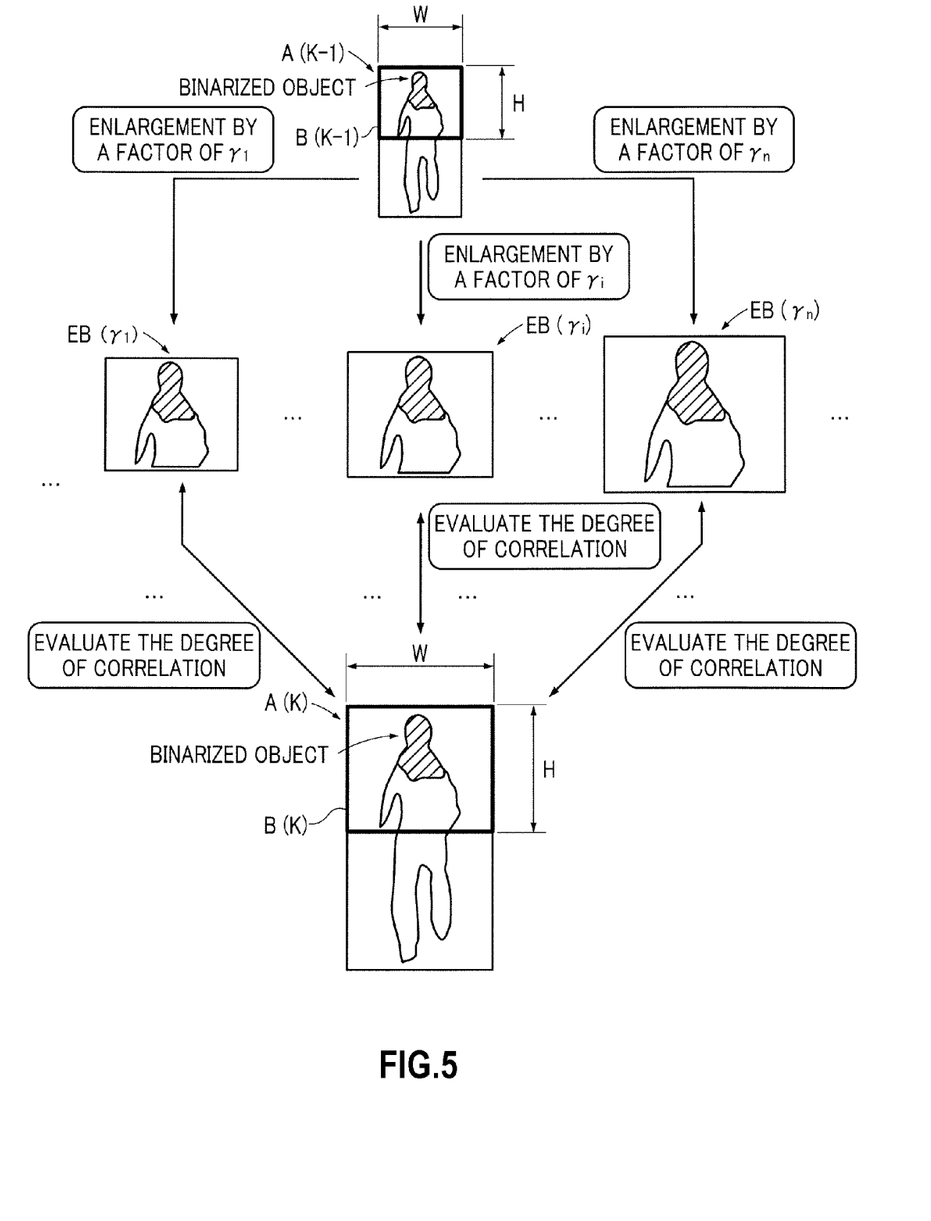
FIG. 5 is an explanatory view related to the calculation of the change rate of the size of the local region.

Specifically, first, an enlarged object region EB is obtained by enlarging the object region (a first object region) B(k−1) at a time k−1 (anterior time or previous time). For example, the previous local region B(k−1) illustrated in the upper section of FIG. 5 is enlarged by a plurality of rates $\gamma_1, \ldots, \gamma_i, \ldots, \gamma_n$ ($1 < \gamma_1 < \ldots < \gamma_i < \ldots < \gamma_n$) respectively, to give the enlarged local regions $EB(\gamma_1), \ldots, EB(\gamma_i), \ldots, EB(\gamma_n)$ illustrated in the middle section of FIG. 5. The previous local region B(k−1) is set to a substantially quadratic shape with the upper end thereof overlapped with the upper end of the object region A(k−1) and with the height H' thereof roughly equal to the width W' of the object region A(k−1).

Thereafter, the correlation between each of the plural enlarged local regions EB and the local region (posterior local region) B(k) at a time k (posterior time or present time) is evaluated, and the scale of enlargement by which the previous local region B(k−1) is enlarged to the enlarged local region EB with the maximum correlation to the posterior local region B(k) is calculated as the change rate (Rate(k)) of the size of the local region B(k).

For example, among the enlarged local regions $EB(\gamma_1), \ldots, EB(\gamma_i), \ldots, EB(\gamma_n)$ illustrated in the middle section of FIG. 5, the enlarged local region $EB(\gamma_i)$ has the maximum correlation to the posterior local region B(k) illustrated in the lower section of FIG. 5, therefore, the scale of enlargement $\gamma_i$ thereof is calculated as the change rate (Rate(k)>1) of the size of the local region B(k).

It is also acceptable that the posterior local region B(k) is reduced by a plurality of reduction rates to give a plurality of reduced local regions, respectively; and among the plurality of reduced local regions, the reciprocal of the reduction rate used to reduce the posterior local region B(k) into a reduced local region with the maximum correlation to the previous local region B(k−1) is calculated as the change rate (Rate(k)>1) of the size of the local region B(k).

Subsequently, the velocity and the yaw rate of the vehicle 1 are determined according to the respective output from the yaw rate sensor 13 and the velocity sensor 14, and the turning angle (azimuth angle) of the vehicle 1 is calculated by integrating the determined value of the yaw rate (FIG. 3/S022).

In comparison with the velocity v(k) of the vehicle 1, the velocity of the object is too small to be ignored; therefore, the distance Z(k) from the vehicle 1 to the object is determined according to the change rate (Rate(k)), the velocity v(k) of the vehicle 1 and a specified interval ΔT by using the expression (1) (FIG. 3/S024).

$$Z(k) = \text{Rate}(k) v(k) \Delta T / (1 - \text{Rate}(k)) \quad (1)$$

Then, the vehicle periphery monitoring apparatus 10 calculates the real spatial position of the object as P(k)=(X(k), Y(k), Z(k)) according to the distance Z(k) from the vehicle 1 to the object (FIG. 3/S026).

Specifically, the X coordinate X(k) and the Y coordinate Y(k) of the object in the real spatial coordinate system are calculated according to the corrected distance Z(k) from the vehicle 1 to each object, the focal distance f of the infrared camera 11, and the coordinates x(k) and y(k) of each region in the image coordinate system corresponded to each object in the captured image by using the expression (2). The central point, the right direction and the downward direction of the captured image are defined as the origin o, +x direction and +y direction of the image coordinate system, respectively. Thereafter, the real spatial position (X(k), Y(k), Z(k)) is corrected by the turning angle determined from the output of the yaw rate sensor 15.

$$X(k) = x(k) \cdot Z(k) / f$$

$$Y(k) = y(k) \cdot Z(k) / f \quad (2)$$

On the basis of the real spatial position P(k) of each object at different times, the level or the presence of contact possibility between the vehicle 1 and each object is determined according to the determination approach on collision possibility disclosed in, for example, Japanese Patent Laid-open No. 2001-6096 (FIG. 3/S028).

If it is determined that the level of contact possibility between the vehicle 1 and the object is high (FIG. 3/S028 . . . YES), a first control process is performed (FIG. 3/S030). Specifically, an audio voice and an image (a frame or the like emphasizing the object) are output through the audio output device 16 and the image output device 17, respectively, according to the determination result of the contact possibility. It is acceptable to output only the audio voice or only the image.

When the vehicle 1 is traveling with a part of or the entire part of a steering device, a braking device and an accelerating device operated by an actuator, the vehicle 1 is controlled in addition to or in place of outputting an audio voice and an image. Specifically, a part of or the entire part of the steering device, the braking device and the accelerating device of the vehicle 1 may be controlled by a vehicle control unit (not shown) to avoid contacting or to be easy to avoid contacting with an object which is determined to have a high contact possibility of contacting with the vehicle 1.

For example, the accelerating device is controlled hard to make acceleration when there is a contact possibility by making the stepping force needed to step down the accelerator pedal greater than the normal case where there is no need to avoid contacting with an object. Further, the steering device is controlled so that the steering wheel is easy to be wheeled with a smaller force to a wheeling side than to the opposite side in order to avoid contact between an object and the vehicle 1. Furthermore, the braking force of the vehicle 1 in relation to the stepped amount of the braking pedal of the braking device is controlled to be increased faster than in normal cases. According thereto, the driving of the vehicle 1 is made easier to avoid contacting with an object.

The first control process may be performed on a condition that the brake of the vehicle 1 has been confirmed not to be operated by a driver according to the output from the brake sensor 15, or the deceleration of the vehicle 1 has been confirmed to be equal to or smaller than a threshold according to the output from the velocity sensor 14 or an acceleration sensor (not shown).

If it is determined that the level of contact possibility between the vehicle 1 and an object is low (FIG. 3/S028 . . . NO), a second control process is performed (FIG. 3/S032).

Specifically, an audio voice and an image different from those generated in the first control process are output through the audio output device 16 and the image output device 17, respectively, according to the determination result of the contact possibility. The vehicle behavior is controlled with forces weaker than the forces generated in the first control process. The second control process may be omitted.

According to the vehicle periphery monitoring apparatus 10 with the functions mentioned above, the change rate (Rate (k)) of the size of the local region B(k) which is a partial region of the object region A(k) is calculated (refer to FIG. 3/S020).

Specifically, when the enlarged local region EB(γi) obtained by enlarging a local region (previous local region) B(k−1) at the previous time k−1 has the maximum correlation to a local region (posterior local region) B(k) at a posterior time k later than the previous time k−1, the scale of enlargement thereof is calculated as the change rate (Rate (k)) of the size of the local region B(k) (refer to FIG. 5). The enlarged local region EB(γi) with the maximum correlation to the posterior local region B(k) is equivalent to a predicted or estimated future image of the previous local region B(k−1) at the posterior time k.

Further, the local region B(k) is defined to be an image region where the partial portion of the object with less motions, in other words, an image region where the change of the size due to the motions of the object is inhibited to the minimum. Thereby, the change rate (Rate(k)) of a size of an object identical to the object in the image which is moving with a varying posture or shape can be calculated at a high accuracy. Thereby, on the basis of the change rate (Rate(k)), the distance Z(k) from the vehicle 1 to the object or the position P(k) of the object can be determined at a high accuracy even when the object is moving (refer to FIG. 3/S024 and S026, FIG. 5).

Furthermore, in consideration of the fact that the partial portion with relatively less motions will become different in relation to different types of the objects, therefore, on the basis of the change rate of the size of the local region B(k) where the change of the size due to the motions of the object is inhibited to the minimum, the distance from the vehicle 1 to the object or the position of the object can be determined at a high accuracy for various types of objects (refer to FIG. 3/S016 and S018).

Especially, in consideration of the fact that the upper body of a pedestrian serving as the object has less motions than the lower body thereof, therefore, on the basis of the change rate of the size of the local region B(k) where the change of the size due to the motions of the pedestrian is inhibited to the minimum, the distance Z(k) from the vehicle 1 to the pedestrian serving as the object or the position P(k) thereof can be determined at a high accuracy.

What is claimed is:

1. A vehicular periphery monitoring apparatus configured to monitor a periphery of a vehicle according to an image acquired from a single imaging device mounted in the vehicle to denote the periphery of the vehicle, comprising:

a first processing element configured to set a region in the image where an object is present as an object region and to determine a type of the object by matching shape patterns based on a shape of the object, and on basis of the type of the object, to set a partial region of the object region whose alignment with respect to the object region is predetermined according to the type of the object as a region where a partial portion of the object with relatively less motions is present as a local region; and a second processing element configured to calculate a change rate of the size of the local region in the image at different time and determine a distance from the vehicle to the object according to the change rate of the size of the local region, wherein the first processing element evaluates the degree of correlation between an enlarged local region obtained by enlarging a local region at a previous time and a local region at a posterior time later than the previous time; and the second processing element calculates the scale of enlargement of the local region at the previous time when the degree of correlation is the maximum as the change rate of the size of the local region.

2. The vehicular periphery monitoring apparatus according to claim 1, wherein the first processing element determines whether or not the type of the object is of a pedestrian by matching shape patterns based on the shape of the object, and sets an upper portion of the object region as the local region on condition that the type of the object has been determined to be of a pedestrian.

3. The vehicular periphery monitoring apparatus according to claim 2, wherein the first processing element sets a region where an upper end thereof coincides with an upper end of the object region and a height thereof equals to a width of the object region as the local region.

* * * * *